June 3, 1924.                                         1,496,076
F. WALZ
TOOL HOLDER
Filed Nov. 3, 1922
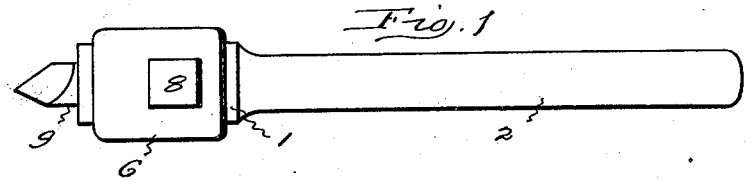
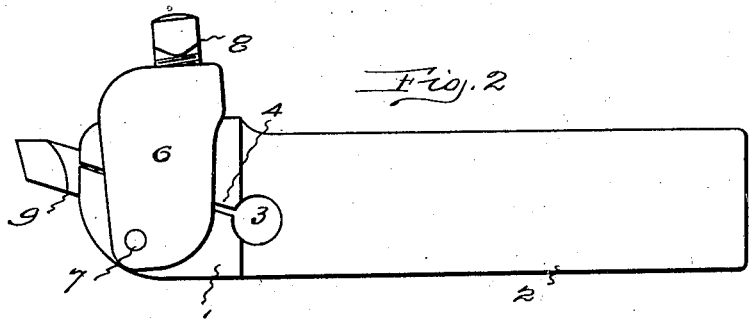
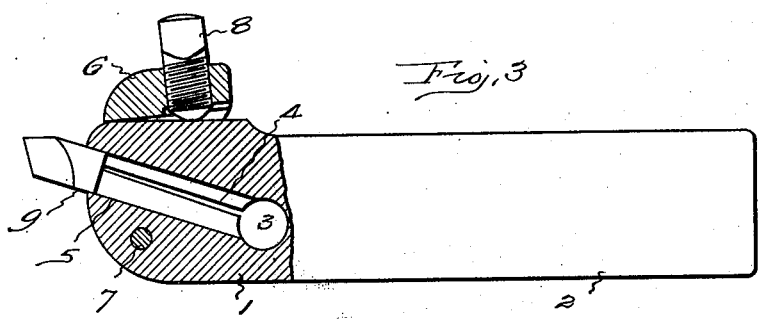
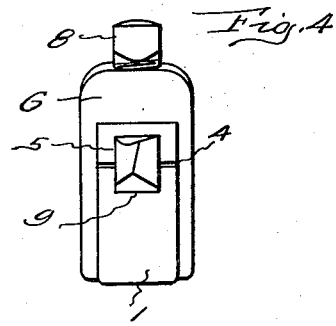
INVENTOR
Fredrick Walz
by
Harry R. Williams
atty.

Patented June 3, 1924.

1,496,076

UNITED STATES PATENT OFFICE.

FREDRICK WALZ, OF BURNSIDE, CONNECTICUT.

TOOL HOLDER.

Application filed November 3, 1922. Serial No. 598,914.

*To all whom it may concern:*

Be it known that I, FREDRICK WALZ, a citizen of the United States, residing at Burnside, in the county of Hartford and State of Connecticut, have invented a new and useful Improvement in Tool Holders, of which the following is a specification.

This invention relates to a holder for turning, threading and boring tools which are used in lathes, shapers, planers, boring mills and machines of the like character. These tools are usually made from expensive stock, such as high speed steel. They soon dull and are repeatedly resharpened. In practically every machine shop there will be found discarded large numbers of these tools that have been reground until they are too short to be securely held in the holders commonly used. In extensive shops the number of short tools is great and the cost of the stock of these discarded tools amounts to a very substantial sum.

The object of the present invention is to provide a simple, cheap and rugged holder which will firmly and securely hold very short tools of this nature in an efficient manner and thus by enabling the tools to be used until much shorter than can now be done effect a considerable saving in the tool account.

In the accompanying drawings Figure 1 shows a top view of a holder that embodies the invention. Fig. 2 shows a side view of the holder. Fig. 3 shows a side view with a portion broken away to illustrate the manner in which a short tool is clamped. Fig. 4 shows a front end view of the holder.

The holder illustrated has a head 1 with a shank 2 that is designed to be held in any common type of tool post. At the back end of the head a hole 3 is bored or drilled transversely of the shank. A slit 4 is made at an angle to the axis of the holder from the front end of the head to the transverse bore. This permits a slight yielding of the head, particularly at the front end. The tool socket 5, which preferably is square in cross section, extends from the front end of the head to the transverse bore on substantially the same angle to the axis of the holder as the slit, a part of the socket being in the head below the slit and a part in the head above the slit.

Straddling the head is a yoke 6 that is pivoted to the section of the head below the slit by a pin 7. The upper part or cross piece of the yoke carries a screw 8 which is adapted to be turned against the section of the head above the slit. This screw is so positioned with relation to the pivot of the yoke, that is, it so impinges against the head back of the line between the axis of the pivot and the point where the inner wall of the yoke bears against the head, that when it is turned inward the yoke is caused to swing forward on the pivot and wedge the two parts of the head together. This construction not only tends to contract the head bodily and thus constrict the tool socket, but it wedges the front end or more yielding sections of the head together very powerfully, which action ensures a very firm and tight bite on the end of a short tool 9 in the tool socket, as illustrated in the drawings. When the screw is turned outward the yoke is free to swing backward and the sections of the head to spring apart so as to release the tool. With this holder many tools which have been so ground down that they are considered too short to be firmly held in the holders in common use and have been discarded may be continued in use with a consequent substantial saving in the tool cost of the manufacturer.

The invention claimed is:—

1. A tool holder having a head with a transverse perforation, a slit extending at an angle to the axis of the holder from the front end to the perforation and a tool socket extending obliquely from the front end of the head to the perforation, a yoke pivoted to the head on one side of the slit and adapted to bear against the head on the other side of the slit, and a screw threaded into the yoke and adapted to impinge against the head back of the yoke pivot so that when the screw is turned in, the yoke tends to swing forward and wedge the sections of the head together.

2. A tool holder having a head with a transverse perforation, a slit extending from the front end to the perforation and a tool socket extending from the front end of the head parallel with the slit, a yoke pivoted to the head on one side of the slit and adapted to bear against the head on the other side of the slit, and a screw threaded into the yoke and adapted to impinge against the head back of the yoke pivot.

3. A tool holder having a head with a transverse perforation, a slit extending at an angle to the axis of the holder from the front end to the perforation and a tool socket extending partly on each side of the slit obliquely from the front end of the head to the perforation, a yoke pivoted to the head on one side of the slit and adapted to bear against the head on the other side of the slit, and a screw threaded into the yoke and adapted to impinge against the head on the same side that the yoke bears.

4. A tool holder comprising a shank and a yielding head with a contractable tool socket at its outer end, a yoke pivoted to one section of the head and adapted to engage the other section of the head, and a screw turning through the yoke and adapted to impinge against the head back of the yoke pivot and cause the yoke to contract the head and constrict the tool socket.

5. A tool holder comprising a shank and a head with a yielding tool socket, a yoke pivoted to the head, and a screw threaded through the yoke, said screw being positioned to cause the yoke to swing on its pivot and engage the head and constrict the tool socket.

6. A tool holder having a head with a slit extending at an angle to the axis of the holder from the front end of the head and a tool socket extending parallel with the slit, a yoke pivoted to the head on one side of the slit and adapted to bear against the head on the other side of the slit in front of the yoke pivot, and a screw threaded into the yoke and adapted to impinge against the head back of the yoke pivot.

7. A tool holder having a slitted head and a tool socket extending inward from the front end of the head, a yoke pivoted to the head on one side of the slit and adapted to bear against the head on the other side of the slit, and a screw threaded into the yoke and adapted to impinge against the head back of the yoke pivot and cause the yoke to, in co-operation with the screw, contract the head and constrict the tool socket.

FREDRICK WALZ.